United States Patent [19]
Courtney

[11] 3,820,697
[45] June 28, 1974

[54] VALVES WITH VIBRATORY VALVE SEATS

[75] Inventor: William John Courtney, Trythall, Northumberland, England

[73] Assignee: Trythall Design and Development Ltd., Fareham, Hampshire, England

[22] Filed: Nov. 10, 1972

[21] Appl. No.: 305,561

[30] Foreign Application Priority Data
Nov. 16, 1971 Great Britain.................... 53092/71

[52] U.S. Cl................. 222/196, 137/219, 222/525, 259/DIG. 43
[51] Int. Cl.............................................. B65g 3/12
[58] Field of Search........... 222/196, 200, 525, 195, 222/559; 259/1 R, DIG. 43; 137/219

[56] References Cited
UNITED STATES PATENTS

| | | | |
|---|---|---|---|
| 1,477,722 | 12/1923 | Slattery........................ | 137/219 X |
| 2,528,319 | 10/1950 | Peterson............................ | 259/1 R |
| 2,569,085 | 9/1951 | Wood et al......................... | 222/200 |
| 3,053,420 | 9/1962 | DeSaint-Martin.................. | 222/195 |
| 3,099,138 | 7/1963 | Hightower et al.............. | 222/200 X |
| 3,339,808 | 9/1967 | Sterns................................ | 222/196 |

*Primary Examiner*—Robert B. Reeves
*Assistant Examiner*—Francis J. Bartuska
*Attorney, Agent, or Firm*—Larson, Taylor and Hinds

[57] ABSTRACT

A valve for controlling the flow of fluids, powders, granules and like flowable materials, in which the valve comprises a valve body, a cylindrical valve closure member slidable between a retracted open position and an extended closed position and vibratory means located adjacent an annular inlet aperture of the valve to assist the passage of material through the valve.

4 Claims, 2 Drawing Figures

VALVES WITH VIBRATORY VALVE SEATS

This invention relates to valves for controlling the flow of fluids, powders, granules and like flowable materials.

According to the invention, there is provided a valve for controlling the flow of fluids, powders, granules and like flowable materials, the valve comprising a valve body having a cylindrical valve closure member slidable between a retracted position in which an annular material aperture of the valve is open and an extended position in which the closure member engages an annular valve seat to close said aperture, and means located adjacent said aperture and operable to transmit a force or forces to the material entering the valve aperture to assist the passage of the material through the device.

Figure 1:
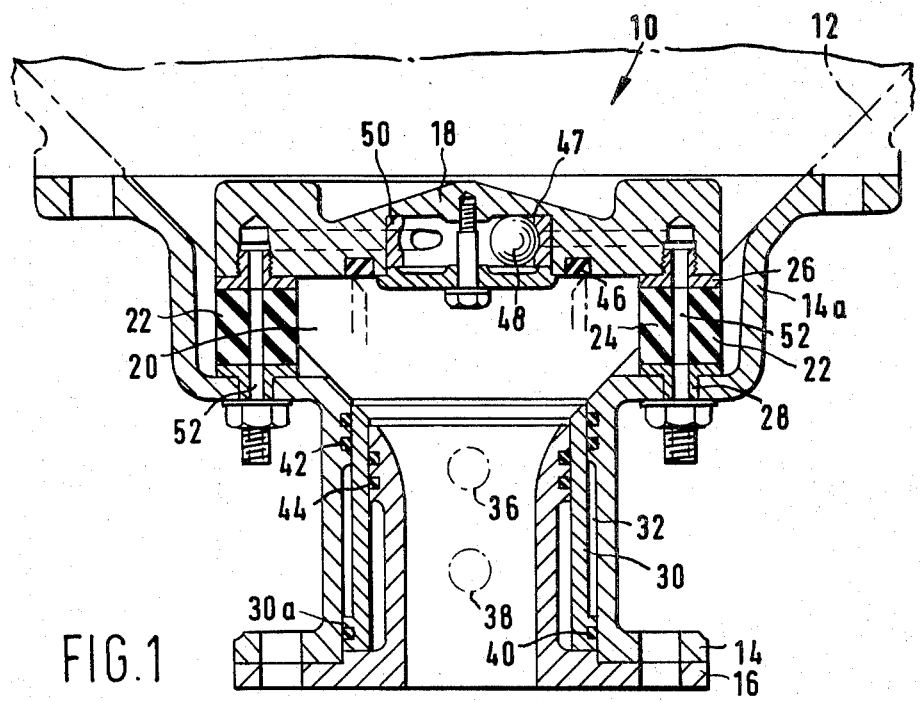
Figure 2:
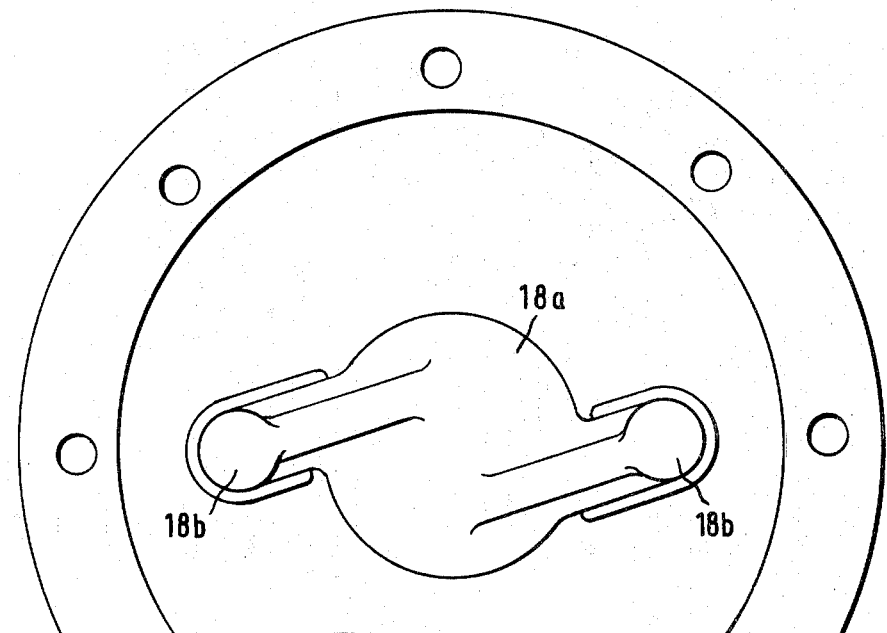

An embodiment of the invention will now be described by way of example only with reference to the accompanying drawings, in which:

FIG. 1 is a longitudinal section through a flow control valve according to the invention, and FIG. 2 is a part plan view of the valve of FIG. 1.

Referring to the Figures, the valve 10 is suitable for controlling the flow of powder or granular materials in their fall under gravity from an upper hopper 12 to a lower material processing equipment (not shown) such as a pressure vessel. The valve includes outer and inner valve bodies 14 and 16 respectively secured, as for example by bolts to the processing equipment. The outer valve body has an enlarged upper portion 14a in which is disposed a member 18 having a generally circular body portion 18a located with its central axis coincident with the longitudinal axis of the valve and having opposite extending ear portions 18b. The member 18 is spaced from the valve body 14 to define an annular valve aperture 20 and is mounted on two flexible mountings 22. Each mounting consists of a resilient body 24 such as rubber, bonded to end plates 26 and 28 respectively secured to member 18 and valve body 14.

To control the flow of material through aperture 20, the valve 10 includes an axially slidable, cylindrical closure member 30 movable from a retracted lower limit position (shown in full lines) in which aperture 20 is fully open to an extended upper limit position (shown in dotted lines) in which aperture 20 is fully closed. The lower part 30a, of member 30 is enlarged to provide a piston which is slidable in an annular cylinder space 32 formed between outer and inner valve bodies 14 and 16. Movement of the closure member toward its limit positions is effected by pressure fluid applied via ports 36 and 38 to one side or other of the piston; seals 40, 42 and 44 are provided in the piston and outer and inner valve bodies respectively to seal space 32. The effective piston area for raising the closure member to its closed position is greater than that to lower the member to its open position; the upper edge of the closure member forms a tight seal with a valve seat provided by an annular sealing ring 46 located in a recess in the lower surface of member 18.

To reduce or prevent "bridging" or "packing" of the materials at the bottom of the hopper when the closure member is opened, member 18 is provided with a vibrator 47 consisting of a ball element 48 rotatable in a race 50 under the influence of a pressure fluid. The mountings 22 are provided with bores 52 extending therethrough one bore constituting an inlet for the fluid and the other a fluid outlet. Since vibration is only required when the valve is open, a control device (not shown) may be provided which will bring the vibrator into action as the closure member leaves the member 26 in an opening direction and which will inactivate the vibrator during the closing movement of the closure member.

In a modification (not shown) the closure member is moved manually by a handle attached thereto and passing through a slot in an outer wall of the outer valve body. The slot is cam-shaped so that by moving the handle lengthwise of the slot, the closure member is moved toward its open or closed position. Conveniently, the angle of movement of the handle is 180°, the position of the handle relative to the valve body indicating the degree of opening or closing of the valve.

It will be apparent that the above described valves are of simple construction and can be manufactured at low cost, the valves being capable of handling the widest possible range of materials extending from liquids to powders and granules.

What is claimed is:

1. A valve for controlling the flow of powders, granules and like flowable materials, flowing from an upper hopper, the valve comprising a valve body, said valve body having a central aperture, therethrough, the upper end of said valve body being adapted to be secured to the lower end of a hopper a vibratory inner member disposed within the central aperture in the valve body and in axial alignment therewith, the outer peripheral surface of said inner member being spaced inwardly of the inner surface of said valve body thereby providing a substantially annular material aperture for said valve between said inner member and said valve body;

resilient means for mounting said vibratory inner member on said valve body, a valve seat on said vibratory inner member;

a valve closure member slidable between a lower retracted position in which said annular material aperture is open and an upward extended position in which said valve closure member engages said valve seat to close said annular material aperture; and means to vibrate said vibratory inner member.

2. A valve according to claim 1, wherein said resilient mounting means are provided with bores extending therethrough to enable power to be transmitted to the vibratory member.

3. A valve according to claim 1, and including a pneumatically operated device for vibrating the vibratory member, the device including a vibrating element impelled to move relative to the vibratory member by air under pressure.

4. A valve according to claim 1, wherein the valve closure member has an enlarged end to form a piston movable in a cylinder formed in the valve body and wherein inlets for fluid under pressure communicate with the cylinder.

* * * * *